(12) United States Patent
Davis et al.

(10) Patent No.: US 8,464,549 B2
(45) Date of Patent: Jun. 18, 2013

(54) AIRWAY SEAL APPARATUS AND METHOD, AND REFRIGERATOR APPARATUS USING THE SEAL

(75) Inventors: Matthew William Davis, Louisville, KY (US); Wayne Edward Lawson, LaGrange, KY (US); Krzysztof Struminski, Louisville, KY (US)

(73) Assignee: General Electric Company, Schenectady, NY (US)

( * ) Notice: Subject to any disclaimer, the term of this patent is extended or adjusted under 35 U.S.C. 154(b) by 386 days.

(21) Appl. No.: 12/901,881

(22) Filed: Oct. 11, 2010

(65) Prior Publication Data
US 2012/0085120 A1   Apr. 12, 2012

(51) Int. Cl.
*F25C 1/22* (2006.01)

(52) U.S. Cl.
USPC ................... 62/340; 62/441; 62/449

(58) Field of Classification Search
USPC ............... 62/340, 441, 449, 412, 404, 414, 62/419; 277/315, 325, 625, 630, 633
See application file for complete search history.

(56) References Cited

U.S. PATENT DOCUMENTS

| | | | |
|---|---|---|---|
| 3,650,122 A * | 3/1972 | Lieberman | 62/298 |
| 6,044,659 A | 4/2000 | Ji | |
| 7,188,479 B2 | 3/2007 | Anselmino et al. | |
| 2006/0086128 A1 * | 4/2006 | Maglinger et al. | 62/344 |
| 2006/0260348 A1 | 11/2006 | Martin et al. | |
| 2006/0260350 A1 | 11/2006 | Van Meter et al. | |
| 2008/0148761 A1 * | 6/2008 | Venkatakrishnan et al. | 62/340 |
| 2009/0145158 A1 * | 6/2009 | Anselmino et al. | 62/344 |
| 2009/0249816 A1 * | 10/2009 | Park | 62/340 |
| 2010/0050680 A1 * | 3/2010 | Venkatakrishnan et al. | 62/340 |
| 2010/0218541 A1 * | 9/2010 | Kim | 62/340 |
| 2010/0218542 A1 * | 9/2010 | McCollough et al. | 62/345 |
| 2010/0251743 A1 * | 10/2010 | Lee et al. | 62/340 |

FOREIGN PATENT DOCUMENTS

| | | |
|---|---|---|
| EP | 053519 A1 | 4/1993 |
| EP | 053519 B1 | 5/1996 |
| EP | 0895043 A2 | 2/1999 |
| WO | 2006083111 A1 | 8/2006 |

* cited by examiner

*Primary Examiner* — Mohammad M Ali
(74) *Attorney, Agent, or Firm* — Global Patent Operation; Douglas D. Zhang (57) ABSTRACT

A refrigerator includes a body portion having an air supply and an air return, a door hinged to the body portion, and an icemaking unit located on the door and having an air inlet and an air outlet. The air inlet and air outlet are adjacent the air supply and air return, respectively, when the door is closed, to receive and return chilled air therefrom and thereto. At least a first sealing member is located at the air supply, the air return, the air inlet, and/or the air outlet. The at least first sealing member includes a first membrane with a slit formed therein, and a first projecting member. The slit and the first projecting member are configured and dimensioned such that the slit is closed when the door is in an open position and that the slit is opened when the door is in a closed position.

10 Claims, 8 Drawing Sheets

AIRWAY SEAL APPARATUS AND METHOD, AND REFRIGERATOR APPARATUS USING THE SEAL

BACKGROUND OF THE INVENTION

The subject matter disclosed herein relates to refrigeration, and more particularly to sealing of airways and the like.

It is now common practice in the art of refrigerators to provide an automatic icemaker. In a "side-by-side" type refrigerator where the freezer compartment is arranged to the side of the fresh food compartment, the icemaker is usually disposed in the freezer compartment and ice is usually dispensed through an opening in the access door of the freezer compartment. In this arrangement, ice is formed by freezing water with cold air in the freezer compartment, the air being made cold by the primary temperature circuit or system of the refrigerator which includes an evaporator.

In a "bottom freezer" type refrigerator where the freezer compartment is arranged below a fresh food compartment, convenience suggests that the icemaker be disposed in an ice compartment on the access door of the top mounted fresh food compartment and ice be delivered through an opening in the access door of the fresh food compartment, rather than through the access door of the freezer compartment. However, the air in the fresh food compartment is generally not cold enough to freeze water to form ice. Therefore, chilled air can be used to cool the icemaker.

The primary temperature circuit cools the air in the freezer compartment to a predetermined temperature. The chilled air is then supplied to the ice compartment from the freezer compartment through a secondary temperature circuit. The secondary temperature circuit typically includes an air supply path extending from the freezer compartment to the ice compartment, an air return path extending from the ice compartment to the freezer compartment, and a fan or blower for moving the air in the supply path and the return path.

BRIEF DESCRIPTION OF THE INVENTION

As described herein, the exemplary embodiments of the present invention overcome one or more disadvantages known in the art.

One aspect of the present invention relates to a refrigerator apparatus comprising a body portion having an air supply and an air return, a door hinged to the body portion, and an ice making unit located on the door and having an air inlet and an air outlet. The air inlet is adjacent the air supply when the door is closed, to receive chilled air therefrom. The air outlet is adjacent the air return when the door is closed, to return the chilled air thereto. Also included is at least a first sealing member located at the air supply, the air return, the air inlet, and/or the air outlet. The at least first sealing member in turn comprises a first membrane with at least one slit formed therein, and a first projecting member. The at least one slit of the first membrane and the first projecting member are cooperatively configured and dimensioned such that the at least one slit of the first membrane is closed when the door is in an open position and such that the first projecting member causes the first membrane to deflect, and the at least one slit of the first membrane to open, when the door is in a closed position.

Another aspect relates to an airway seal apparatus comprising a membrane with at least one slit formed therein, and a projecting member. The at least one slit of the membrane and the projecting member are cooperatively configured and dimensioned such that the at least one slit of the membrane is normally closed and such that the projecting member causes the membrane to deflect, and the at least one slit of the membrane to open, when the projecting member is properly aligned with the membrane.

Yet another aspect relates to a method of sealing a chilled air passage between a body of a refrigerator and an ice making unit located on a door of the refrigerator. The method comprises the step of providing, on at least one side of the passage, a first airway seal apparatus comprising a first membrane with at least one slit formed therein, and a first projecting member. At least one slit of the first membrane is closed when the first airway seal apparatus is unloaded. The method also includes causing the first projecting member to be substantially aligned with the first membrane upon closing of the door, such that the at least one slit of the first membrane opens to pass the chilled air. The method further includes causing the first projecting member and the first membrane to rebound to an unloaded state upon opening of the door, such that the at least one slit in the first membrane closes to prevent at least one of loss of the chilled air and infiltration of ambient air.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

Figure 1:
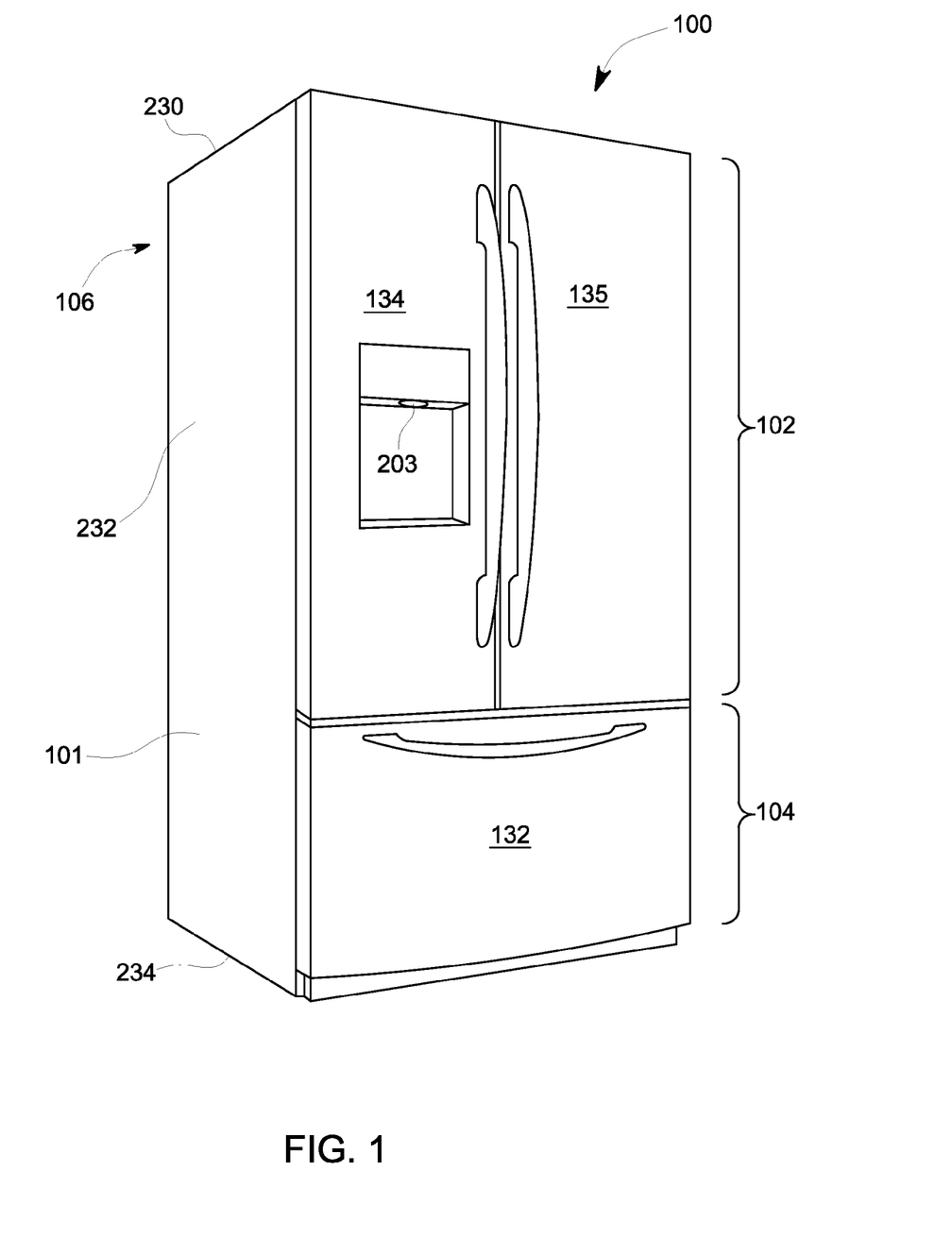
FIG. 1 is a perspective view of an exemplary "bottom freezer" refrigerator, which can employ airway seals, in accordance with a non-limiting exemplary embodiment of the invention.
Figure 2:
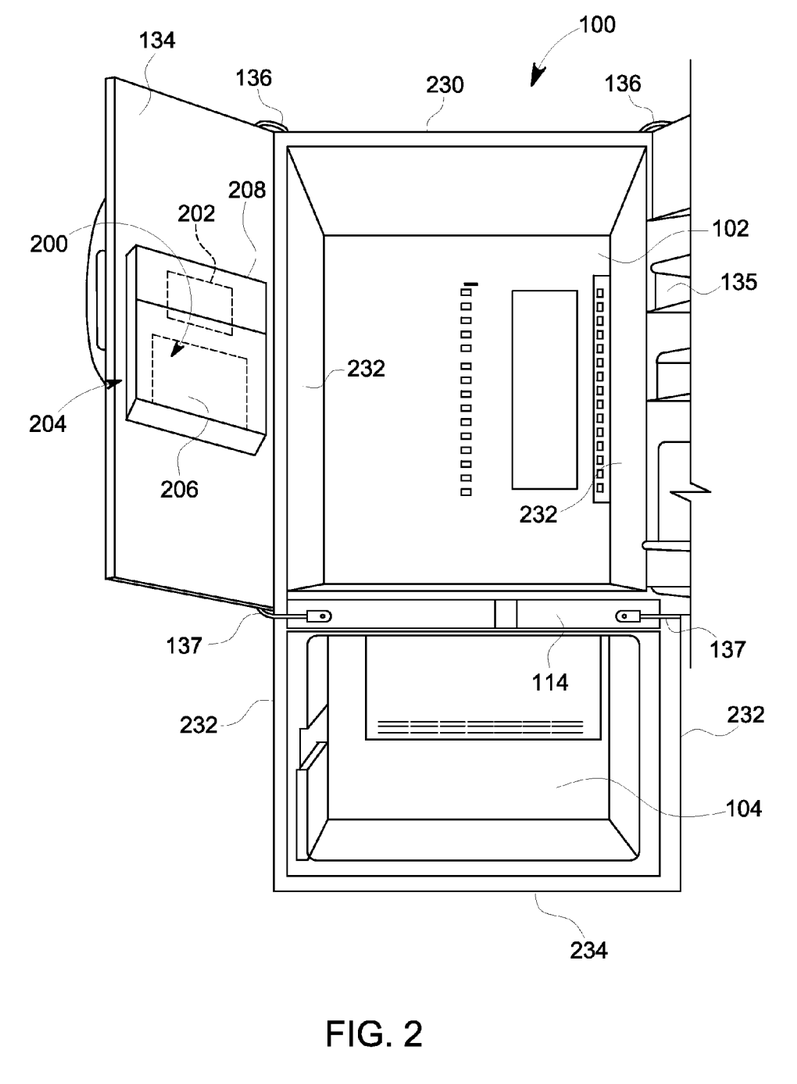
FIG. 2 is a simplified, perspective view of the refrigerator of FIG. 1 with the access doors of the fresh food compartment being in an open position and the drawer for the freezer compartment being removed for clarity.

FIGS. 1 and 2 illustrate an exemplary refrigerator 100 which includes a fresh food compartment 102 and a freezer compartment 104. The refrigerator 100 is cooled using a typical refrigeration cycle temperature circuit. Although the refrigerator 100 is shown as the "bottom freezer" type, the teaching of the description set forth below is applicable to other types of refrigeration appliances, including but not limited to, side-by-side refrigerators and refrigerators cooled using thermoelectric cooling. The present invention is therefore not intended to be limited to any particular type or configuration of a refrigerator.

The freezer compartment 104 and the fresh food compartment 102 are arranged in a bottom mount configuration where the freezer compartment 104 is disposed or arranged beneath or below the fresh food compartment 102. The fresh food compartment 102 is shown with French doors 134 and 135. However, a single access door can be used instead of the French doors 134, 135. The freezer compartment 104 is closed by a drawer or an access door 132.

The fresh food compartment 102 and the freezer compartment 104 are contained within a main body including an outer case 106. The outer case 106 can be formed by folding a sheet of a suitable material, such as pre-painted steel, into a generally inverted U-shape to form top 230 and two sidewalls 232 of the outer case 106. A mullion 114, best shown in FIG. 2, which is for example formed of an extruded ABS material, connects the two sidewalls 232 to each other and separates the fresh food compartment 102 from the freezer compartment 104. The outer case 106 also has a bottom 234, which connects the two sidewalls 232 to each other at the bottom edges thereof, and a back (not shown). As is known in the art, a thermally insulating material can be placed between the outer case 106 and a liner.

The access door 132 and the French doors 134, 135 close access openings to the freezer compartment 104 and the fresh food compartment 102, respectively.

Each French door 134, 135 is mounted to the main body by a top hinge 136 and a corresponding bottom hinge 137, thereby being rotatable about its outer vertical edge between an open position for accessing the respective part of the fresh food compartment 102, as shown in FIG. 2, and a closed position for closing the respective part of the fresh food compartment 102, as shown in FIG. 1.

Similarly, when an access door 132 is used for the freezer compartment 104, it is rotatably attached to the main body in a known fashion. When a drawer is used for the freezer compartment, it is slidably received in the cavity defined by the sidewalls 232, the mullion 114 and the bottom 234 in a known fashion.

As illustrated in FIG. 2, an ice making assembly 200 is mounted on the interior surface of the access door 134 of the fresh food compartment 102 (of course, the ice making assembly 200 can be mounted on the access door 135 instead). The ice making assembly 200 includes a thermally insulated ice compartment 204 mounted or formed on the access door 134, and an icemaker 202 disposed in the ice compartment 204. Water is provided to ice molds of the icemaker 202 through a water supply conduit (not shown) extending from the main body of the refrigerator to the icemaker 202, and then is frozen into ice cubes. Then the ice cubes are usually discharged from the icemaker 202 and stored in an ice storage bin 206 until needed by a user. The ice storage bin 206 is disposed in the ice compartment 204, below the icemaker 202. The ice cubes may be withdrawn by accessing the ice compartment 204 through an access door 208 which faces the fresh food compartment 102 when the access door 134 is closed. However, the ice cubes are typically withdrawn by using an ice dispenser (not shown) installed in the access door 134 through an opening 203 (shown in FIG. 1) formed on the exterior surface of the French door 134. The opening 203 faces away from the fresh food compartment 102 when the access door 134 is closed and is formed at a height facilitating convenient access to the ice. These are known in the art and therefore will not be discussed in detail here.

Because the ice compartment 204 is located in the fresh food compartment 102 which normally has a temperature higher than the freezing point of water, warming of the interior of the ice compartment 204 occurs. To counter this warming, a secondary temperature circuit can be used to circulate a working medium such as air to and from the icemaker 202 and/or the ice compartment 204.

Figure 3:
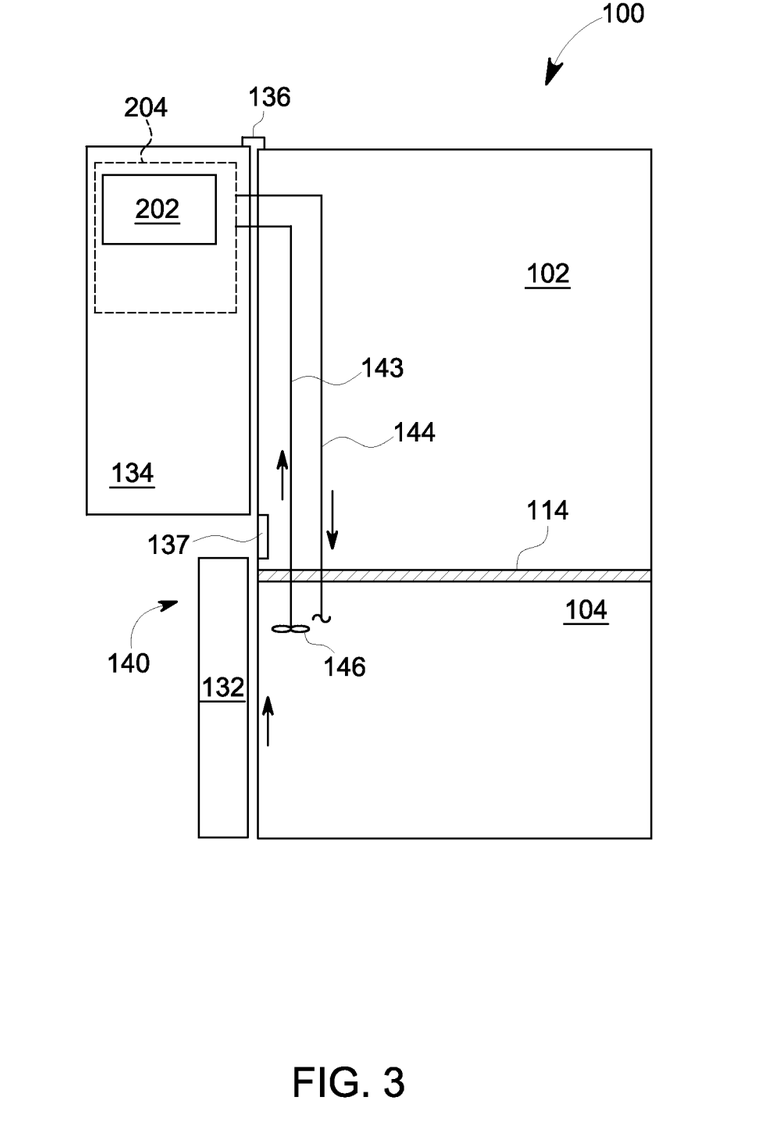
FIG. 3 schematically shows an exemplary secondary temperature circuit used in the refrigerator of FIG. 1.

With reference to FIG. 3, the secondary temperature circuit 140 includes a supply path 143 and a return path 144 between the freezer compartment 104 and the ice compartment 204, and a working medium moving device such as fan 146 for causing cooling air in the freezer compartment 104 to flow to the ice compartment 204 via the supply path 143 and the air in the ice compartment 204 to flow back to the freezer compartment 104 via the return path 144. This configuration is known in the art, and therefore will not be discussed further here.

One or more embodiments of the invention can be used in a refrigerator (for example, the bottom freezer type 100) where the icemaker 202 is on the door 134 of the fresh food compartment 102, and air is circulated from the freezer compartment 104 to cool the ice making compartment 204. As shown in FIG. 3, the cooling air is taken from the freezer compartment 104, it being understood that in a typical refrigeration cycle, heat is absorbed from air or other matter to be cooled in an evaporator, where the heat causes evaporation of the working fluid of the cooling cycle into a vapor state. The vapor may then be compressed in a compressor, condensed back to a liquid in a condenser (wherein the heat is transferred to another medium such as ambient air in the room), and then passes through an expansion valve with concomitant cooling, and back to the evaporator. Thus, the supply of cold air 143 for the icemaker 202 may, in general, be obtained from the freezer compartment 104 or from a separate heat exchanger (evaporator) or even from a thermoelectric cooler.

The supply 143 and return 144 can be realized as ducts. These ducts can originate, for example, at a cooling source located in the freezer compartment 104. As shown most clearly in FIG. 2, an interface or gap exists between the door 134 or 135 and the interior wall 232 of the fresh food compartment to allow the door 134 or 135 to open and close. In order to transfer air from the ducts 143, 144 in the fresh food compartment to the ice compartment 204 on the door 134 and back, a gasket or seal can be added in accordance with the present invention to ensure no air leakage into the main refrigerator compartment.

One or more embodiments of the invention provide a mechanism that allows this air path to be closed off to outside ambient air and temperatures when the main refrigerator door 134, 135 is opened. In devices not employing one or more embodiments of the invention, it has been observed that ice may accumulate at or near these air path openings during operation of the refrigerator 100. This ice accumulates due to the condensation of moist air onto these surfaces when the door is opened, because the ducts 143, 144 are not sealed to the icemaker 202 or door 134 on which it is mounted, under conditions when the door is open One or more embodiments of the invention provide a sealing effect when the door is opened. Accordingly, escape of cold air, with concomitant condensation, is reduced or eliminated. Heretofore, the prevention of condensation has been addressed by assuring the surface temperature to be above the dew point given a certain ambient temperature and humidity. Common practices to increase the surface temperature have included using heat from an external source.

One or more embodiments of the invention provide techniques to cut off air flow in the ducts 143, 144 (and mating portions of the icemaker 202) when the door is opened. When the door is closed, the one or more embodiments of the invention provide a seal as against ambient but open the airway to allow air to flow from the supply duct 143, into the icemaker 202, and back through return duct 144. When the door is opened the seals will close and block airflow.

Figure 4:
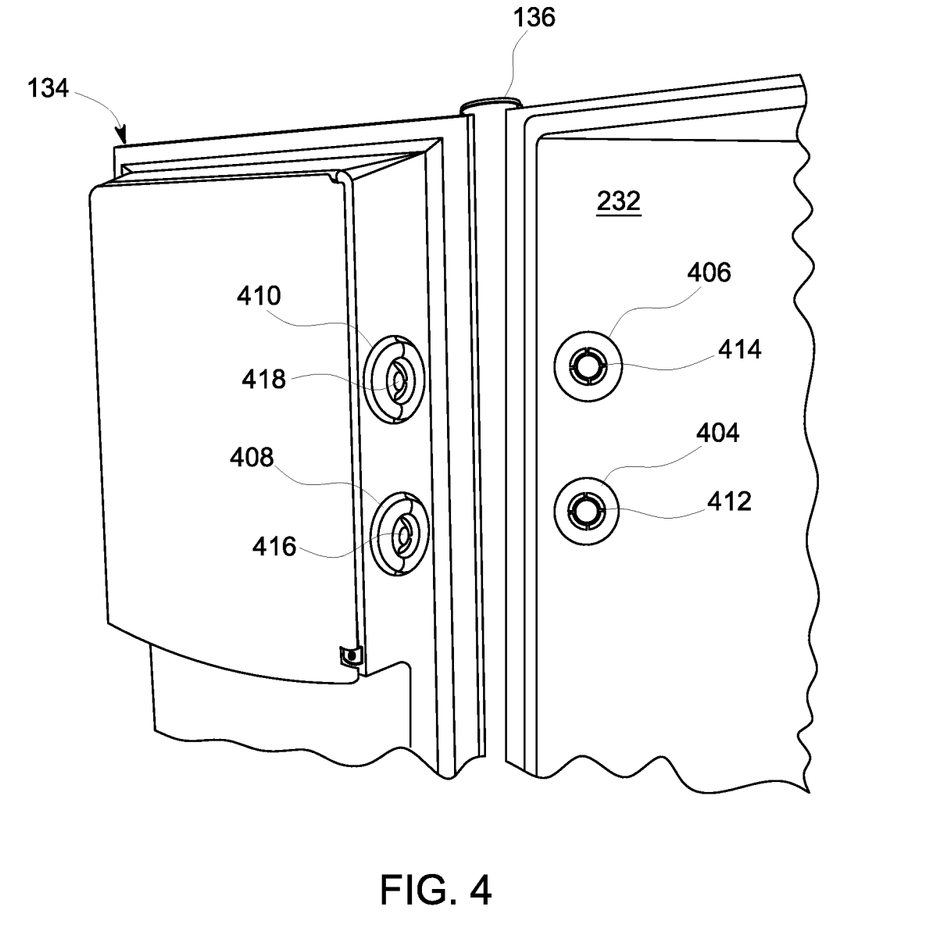
FIG. 4 is a partial simplified, perspective view of the refrigerator of FIG. 1 including airway seals for the secondary temperature circuit.

Reference should now be had to FIG. 4. Note the interior surface of wall 232 and an adjacent region of door 134. Door 134 is shown in a "wide open" position for illustrative convenience. It is noted that the door 134 is hinged on hinges 136, 137 (best shown in FIG. 2) and will typically have a conventional peripheral seal (not shown) to prevent air infiltration to or exfiltration from compartment 102 when door 134 is closed.

In the non-limiting example shown in FIG. 4, and as discussed further below in conjunction with FIGS. 5-7, a first sealing member 404 seals the end of the supply duct 143, a second sealing member 406 seals the end of the return duct 144, a third sealing member 408 mates with sealing member 404 to form a sealable duct between supply duct 143 and the ice compartment 202, while a fourth sealing member 410 mates with sealing member 406 to form a sealable duct between supply duct 144 and the ice compartment 202. Each sealing member 404, 406, 408, 410 includes a projection 412, 414, 416, 418, respectively. The sealing members 404, 406, 408, 410 may be fabricated, for example, using silicone.

Figure 5:
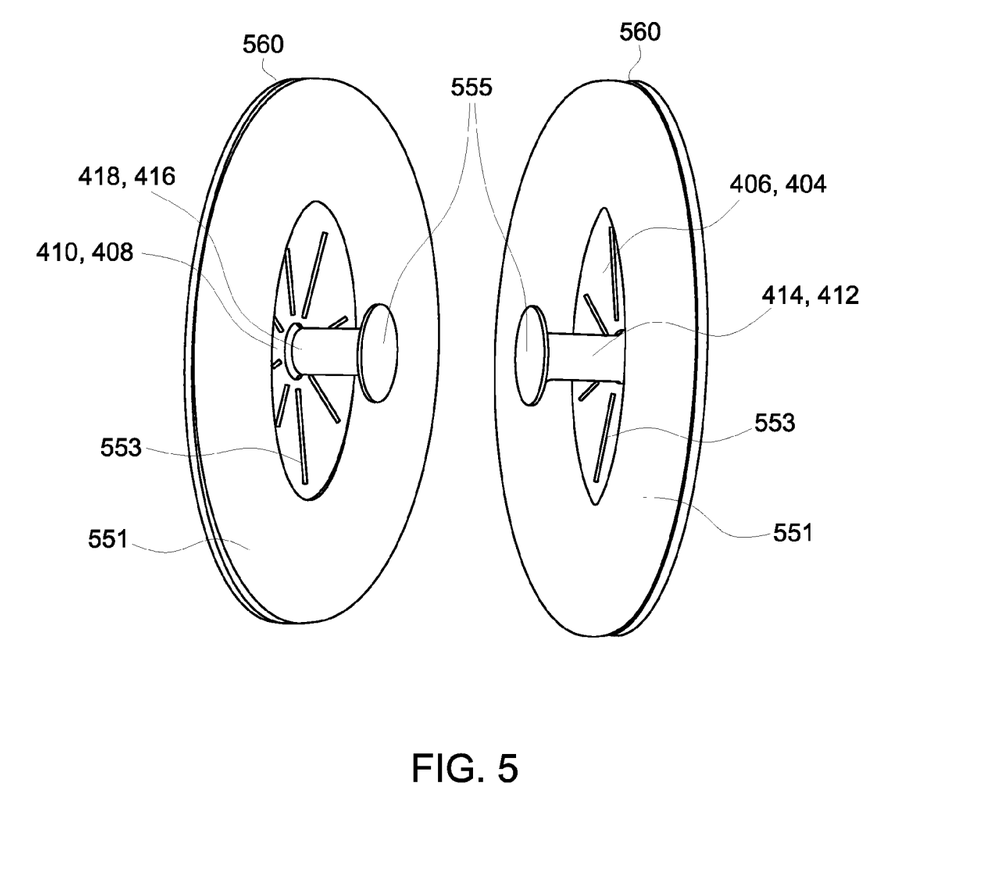
FIGS. 5 and 6 show, respectively, perspective and sectional views of the airway seals, in a condition where the refrigerator door is open and the seals are closed.
Figure 6:
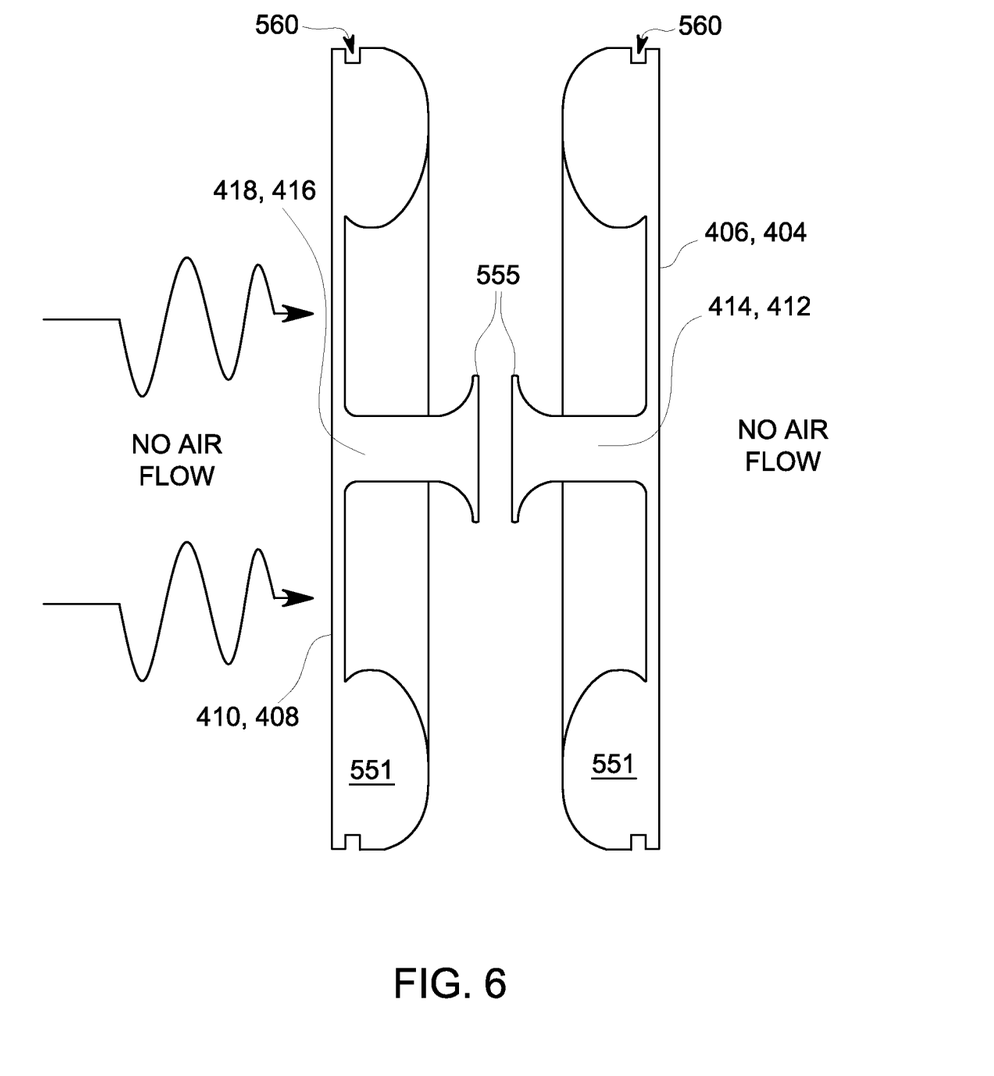

Reference should continue to be had to FIG. 4, and reference should also be had now to FIGS. 5 and 6. The sealing members 404, 406, 408, 410 include central membranes with peripheral regions 551. The membranes have one or more slits 553; for example, cut or otherwise formed along radii emanating substantially outward from the centers of the membranes. Regions 551 may have grooves 560 for engaging the edges of a hole at the end of ducts 143, 144 or mating holes in the door 134. The central projections 412, 414, 416, 418 may have flat regions 555 on their ends which are of a greater diameter than the rest of the projections.

FIGS. 5 and 6 reflect a condition when the door 134 is open and the seals 404, 406, 416, 418 are closed (since slits 553 are closed), thus preventing leakage of air from supply duct 143, into return duct 144, or into interior regions of ice making assembly 200.

Figure 7:
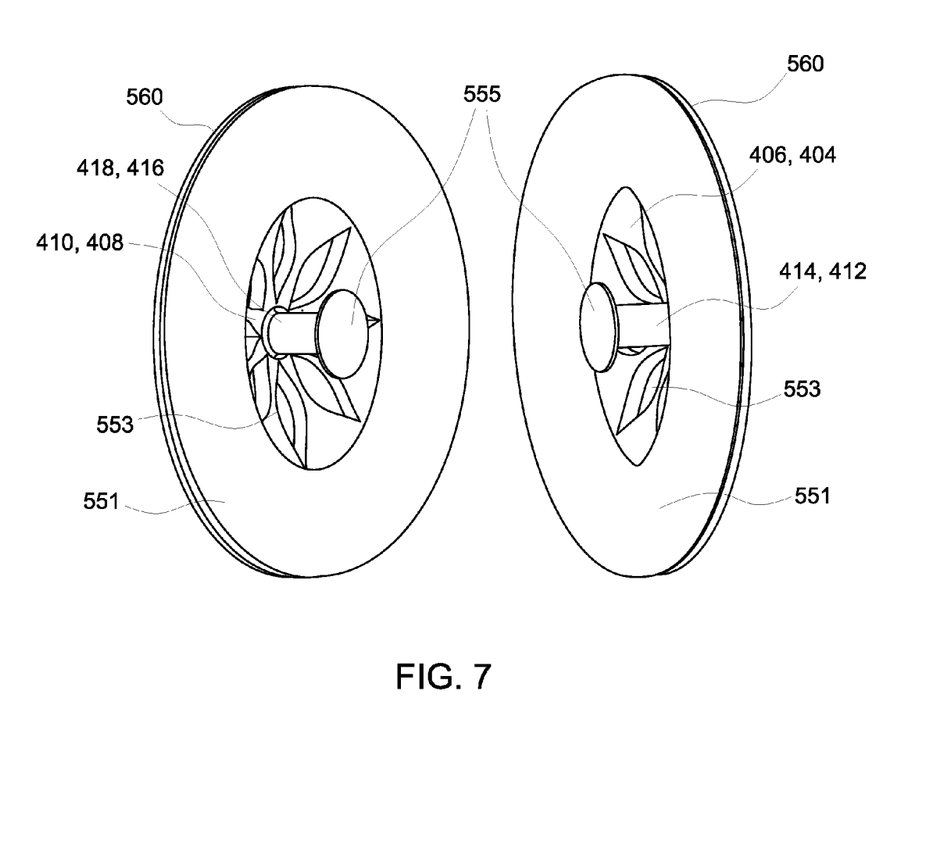
FIGS. 7 and 8 show, respectively, perspective and sectional views of the airway seals, in a condition where the refrigerator door is closed and the seals are open (the seals being shown apart in FIG. 7 for illustrative convenience).
Figure 8:
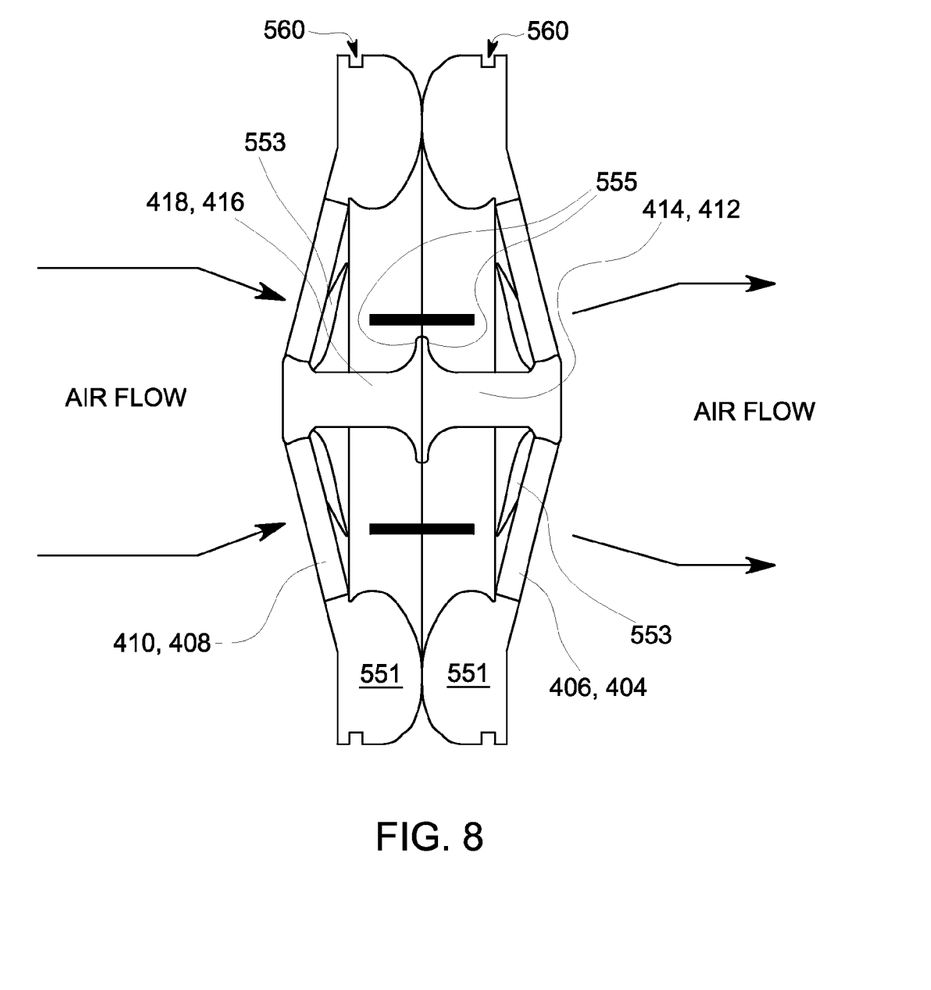

FIGS. 7 and 8, on the other hand, reflect a condition when the door 134 is closed and the seals 404, 406, 416, 418 are open (since slits 553 are open). As best seen in FIG. 8, when the door 134 is closed, projections 416, 418 are urged, respectively, against corresponding projections 412, 414. This causes the membranes of seals 404, 406, 408, 410 to deflect, in turn causing slits 553 to open, for example, in a flower-petal like pattern, allowing air to pass from supply duct 143 into ice making assembly 200, and then from ice making assembly 200 into return duct 144. Peripheral regions 551 engage each other to prevent cooling air leakage to ambient or ambient infiltration into the cooling air ducts.

Note that FIG. 8 shows air flow from sealing member 408, 410 to sealing member 404, 406. It will be understood that in the case of sealing members 406 and 410, the direction of air flow for return air is from member 410 to member 406. Likewise, in the case of sealing members 404 and 408, air flow for supply air, the direction of air flow is from member 404 to member 408.

One or more embodiments of the invention reduce or eliminate entry of moisture to the air path, thus reducing or eliminating ice build up adjacent the sealing members 404, 406, 408, 410, as might occur if the seals remained open when the door was open, since in such a case moisture condenses and freezes on the nearby surfaces. The result of this ice build up could include slow production of ice in ice making assembly 200 and subsequently, the melting of ice cubes therein.

One advantage that may be realized in the practice of some embodiments of the described systems and techniques is the prevention of ice build up adjacent the seals, with resultant slow production and/or melting of ice in the ice maker. Another advantage that may be realized in the practice of some embodiments of the described systems and techniques is the prevention of loss of cooling air from the supply duct 143 when the door is open, which would result in increased load on the refrigeration system. Still another advantage that may be realized in the practice of some embodiments of the described systems and techniques is the prevention of infiltration of ambient air to the return duct 144 when the door is open, which would result in an increase in temperature of freezer compartment 104. Yet another advantage that may be realized in the practice of some embodiments of the described systems and techniques is the simple mechanical opening and closing of the sealing members by opening and closing of the door.

Given the discussion thus far, it will be appreciated that, in general terms, a refrigerator apparatus 100, according to an aspect of the invention, comprises a body portion (e.g., with side wall 232) having an air supply (e.g., end of duct 143) and an air return (e.g., end of duct 144), a door 134 hinged to the body portion, and an ice making unit 200 located on the door and having an air inlet and an air outlet (e.g., portions with interface with the supply and return ducts 143, 144). The air inlet is adjacent the air supply when the door is closed, to receive chilled air therefrom. The air outlet is adjacent the air return when the door is closed, to return the chilled air thereto. Also included is at least a first sealing member (one of 404, 406, 408, 410) located at the air supply, the air return, the air inlet, and/or the air outlet. The at least first sealing member in turn comprises a first membrane with at least one slit 553 formed therein, and a first projecting member (one of 412, 414, 416, 418). The at least one slit of the first membrane and the first projecting member are cooperatively configured and dimensioned such that the at least one slit of the first membrane is closed when the door is in an open position, as seen in FIGS. 5 and 6, and such that the first projecting member causes the first membrane to deflect, and the at least one slit of the first membrane to open, when the door is in a closed position, as seen in FIGS. 7 and 8.

The slits 553 are designed to ensure adequate flow area produced when the slits 553 are opened, as would be apparent to a person of ordinary skill in the art. For example, the design of the slits 553 may consider the force required to activate the air flow, and the deflection requirement would be based on variation and control of the gap between the two surfaces.

The cooperative configuration of the at least one slit of the first membrane and the first projecting member can be achieved in a variety of ways. In some instances, as discussed just below, there is a second sealing member with its own identical projection. However, there could be projections of different lengths; one seal could have a double-length projection and the other seal could have no projection, and so on.

In some instances, the refrigerator apparatus further comprises at least a second sealing member located opposite the first sealing member (i.e., at whichever of the air supply, the air return, the air inlet, and the air outlet is opposite the location of the first sealing member. The at least second sealing member in turn comprises a second membrane with at least one slit 553 formed therein. The at least one slit of the second membrane and the first projecting member are cooperatively configured and dimensioned such that the at least one slit of the second membrane is closed when the door is in an open position and such that the projecting member causes the second membrane to deflect, and the at least one slit of the second membrane to open, when the door is in a closed position.

In some cases, as noted, the at least second sealing member further comprises a second projecting member which engages the first projecting member when the door is closed to cause the at least one slit of the first membrane and the at least one slit of the second membrane to open, as in FIGS. 7 and 8.

While in the broadest case there might be only one seal, or one pair of seals, in many embodiments there will be third and fourth sealing members located at whichever of the air supply, the air return, the air inlet, and the air outlet, do/does not have the first and second sealing members. The third sealing member in turn comprises a third membrane, with at least one slit 553 formed therein, and a third projecting member 412, 414, 416, 418. The fourth sealing member in turn comprises a fourth membrane with at least one slit 553 formed therein, and a fourth projecting member 412, 414, 416, 418. The at least one slit of the third membrane, the at least one slit of the fourth membrane, the third projecting member, and the fourth projecting member are cooperatively configured and dimensioned such that the at least one slit of the third membrane and the at least one slit of the fourth membrane are closed when the door is in an open position, as in FIGS. 5 and 6, and such that the third and fourth projecting members engage each other and cause the third and fourth membranes to deflect, and the at least one slit of the third membrane and the at least one slit of the fourth membrane to open, when the door is in a closed position, as in FIGS. 7 and 8.

The first, second, third and fourth sealing members can, in some instances, each further comprise a peripheral region 551 configured and dimensioned to engage a corresponding one of the peripheral regions to prevent loss of the chilled air or infiltration of ambient air (as best seen in FIG. 8).

In some instances, the first, second, third, and fourth projecting members 412, 414, 416, 418 each have a basic diameter, and the first, second, third, and fourth projecting members each further comprise a distal end 555 (i.e., end opposite the membrane) having a larger diameter than the basic diameter. In one or more embodiments, the peripheral regions of the sealing members are each formed with a mounting groove 560.

The refrigerator apparatus can, in one or more embodiments, further comprise a chilled air source (as discussed above, a non-limiting example is freezer compartment 104), a supply duct 143 interconnecting the chilled air source and the air supply, and a return duct 144 interconnecting the air return and the chilled air source. A circulating fan 146 can be mounted to cause the chilled air to move from the chilled air source, into the supply duct, through the ice making unit, and back to the chilled air source through the return duct. As noted elsewhere, in some cases, the body portion has freezer compartment 104 and a food compartment 102, the door comprises a door 134 of the food compartment, and the chilled air source comprises the freezer compartment. The freezer compartment, in some instances, is located below the food compartment.

Furthermore, in general terms, an airway seal apparatus, according to another aspect of the invention comprises a membrane with at least one slit 553 formed therein, and a projecting member 412, 414, 416, 418. The at least one slit of the membrane and the projecting member are cooperatively configured and dimensioned, as described above, such that the at least one slit of the membrane is normally closed and such that the projecting member causes the membrane to deflect, and the at least one slit of the membrane to open, when the projecting member is moved into proper alignment with the membrane.

In one or more embodiments, an enlarged peripheral region 551 surrounds the membrane. Region 551, in some cases, may have mounting groove 560. In some instances, the projecting member has a basic diameter, and the projecting member further comprises a distal end 555, as discussed above, having a larger diameter than the basic diameter.

Furthermore, in general terms, according to still another aspect of the invention, a method is provided for sealing a chilled air passage between a body of a refrigerator (e.g., with side wall 232) and an ice making unit located on a door 134 of the refrigerator. The method comprises the step of providing, on at least one side of the passage, a first airway seal apparatus comprising a first membrane with at least one slit 553 formed therein, and a first projecting member 412, 414, 416, 418. The at least one slit of the first membrane is closed when the first airway seal apparatus is unloaded, as seen in FIGS. 5 and 6 ("unloaded" means the seal is installed in the door or body but does not otherwise have any deforming loads on it). The method also includes causing the first projecting member to be properly aligned with (e.g., substantially perpendicular with) the first membrane upon closing of the door, such that the at least one slit of the first membrane opens to pass the chilled air, as seen in FIGS. 7 and 8. The method further includes causing the first projecting member and the first membrane to rebound to an unloaded state upon opening of the door, such that the at least one slit in the first membrane closes to prevent at least one of loss of the chilled air and infiltration of ambient air, as seen in FIGS. 5 and 6.

In at least some cases, an additional step includes providing, on another side of the passage (i.e., opposite the first airway seal apparatus), a second airway seal apparatus comprising a second membrane with at least one slit formed therein. The at least one slit of the second membrane is closed when the first airway seal apparatus is unloaded. A further step includes causing the first projecting member to deflect the second membrane upon closing of the door, such that the at least one slit of the second membrane opens to pass the chilled air. As described elsewhere, the first projecting member could deflect the second membrane by pushing on a second projecting member, as seen in FIG. 8, or in a variety of other fashions. A still further step includes causing the second membrane to rebound to an unloaded state upon opening of the door, such that the at least one slit in the second membrane closes to prevent the at least one of loss of the chilled air and infiltration of the ambient air, as seen in FIGS. 5 and 6.

As noted, in some cases, the second airway seal apparatus further comprises a second projecting member which engages the first projecting member in the step of causing the first projecting member to deflect the second membrane upon closing of the door. Furthermore, in one or more embodiments, the first and second airway seal apparatuses each further comprise a peripheral region 551, and a further step includes causing the peripheral regions to engage each other when the door is closed, so as to prevent loss of the chilled air or infiltration of the ambient air, as best seen in FIG. 8.

Additional steps, in one or more embodiments, include passing chilled air through the chilled air passage to the ice making unit 200 (for example, using the fan and ducts as described elsewhere herein). In the step of passing the chilled air, the chilled air can be provided, for example, from a remote freezer compartment 104 in the body of the refrigerator.

Thus, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A refrigerator apparatus comprising:
    a body portion having an air supply and an air return;
    a door hinged to said body portion;
    an ice making unit located on said door and having an air inlet and an air outlet, said air inlet being adjacent said air supply when said door is closed, to receive chilled air therefrom, said air outlet being adjacent said air return when said door is closed, to return said chilled air thereto; and
    at least a first sealing member located at at least one of said air supply, said air return, said air inlet, and said air outlet, said at least first sealing member in turn comprising a first membrane with at least one slit formed therein, and a first projecting member, said at least one slit of said first membrane and said first projecting member being cooperatively configured and dimensioned such that said at least one slit of said first membrane is closed when said door is in an open position and such that said first projecting member causes said first membrane to deflect, and said at least one slit of said first membrane to open, when said door is in a closed position.

2. The refrigerator apparatus of claim 1, further comprising at least a second sealing member located at at least one of said air supply, said air return, said air inlet, and said air outlet, opposite said first sealing member, said at least second sealing member in turn comprising a second membrane with at least one slit formed therein, said at least one slit of said second membrane and said first projecting member being cooperatively configured and dimensioned such that said at least one slit of said second membrane is closed when said door is in an open position and such that said projecting member causes said second membrane to deflect, and said at least one slit of said second membrane to open, when said door is in a closed position.

3. The refrigerator apparatus of claim 2, wherein said at least second sealing member further comprises a second projecting member which engages said first projecting member when said door is closed to cause said at least one slit of said first membrane and said at least one slit of said second membrane to open.

4. The refrigerator apparatus of claim 3, further comprising third and fourth sealing members located at at least two of said air supply, said air return, said air inlet, and said air outlet, not having said first and second sealing members, said third sealing member in turn comprising a third membrane with at least one slit formed therein, and a third projecting member, said fourth sealing member in turn comprising a fourth membrane with at least one slit formed therein, and a fourth projecting member, said at least one slit of said third membrane, said at least one slit of said fourth membrane, said third projecting member, and said fourth projecting member being cooperatively configured and dimensioned such that said at least one slit of said third membrane and said at least one slit of said fourth membrane are closed when said door is in an open position and such that said third and fourth projecting members engage each other and causes said third and fourth membranes to deflect, and said at least one slit of said third membrane and said at least one slit of said fourth membrane to open, when said door is in a closed position.

5. The refrigerator apparatus of claim 4, wherein said first, second, third and fourth sealing members each further comprise a peripheral region configured and dimensioned to engage a corresponding one of said peripheral regions to prevent loss of said chilled air or infiltration of ambient air.

6. The refrigerator apparatus of claim 5, wherein said first, second, third, and fourth projecting members each have a basic diameter, and wherein said first, second, third, and fourth projecting members each further comprise a distal end having a larger diameter than said basic diameter.

7. The refrigerator apparatus of claim 6, wherein said peripheral regions of said sealing members are each formed with a mounting groove.

8. The refrigerator apparatus of claim 2, further comprising:
    a chilled air source;
    a supply duct interconnecting said chilled air source and said air supply;
    a return duct interconnecting said air return and said chilled air source; and
    a circulating fan mounted to cause said chilled air to move from said chilled air source, into said supply duct, through said ice making unit, and back to said chilled air source through said return duct.

9. The refrigerator apparatus of claim 8, wherein said body portion further comprises a freezer compartment and a food compartment, said door comprises a door of said food compartment, and said chilled air source comprises said freezer compartment.

10. The refrigerator apparatus of claim 9, wherein said freezer compartment is located below said food compartment.

* * * * *